United States Patent [19]
Lark et al.

[11] 3,726,428
[45] Apr. 10, 1973

[54] CONTROL CIRCUIT FOR FRONT END LOADER

[75] Inventors: Wayne W. Lark, Clarendon Hills; Marvin D. Jennings, Naperville; Arthur J. Howells, Jr., Western Springs, all of Ill.

[73] Assignee: International Harvester Company, Chicago, Ill.

[22] Filed: Feb. 4, 1971

[21] Appl. No.: 112,537

[52] U.S. Cl. .................................214/763, 214/764
[51] Int. Cl. ..............................E02f 3/86, E02f 3/87
[58] Field of Search.......................214/762, 763, 764, 214/138, 771, 132, 1 CM

[56] References Cited

UNITED STATES PATENTS

| | | | |
|---|---|---|---|
| 3,339,763 | 9/1967 | Caywood | 214/762 |
| 3,007,097 | 10/1961 | Shelley | 214/1 CM |
| 3,487,958 | 1/1970 | Shook | 214/762 |

FOREIGN PATENTS OR APPLICATIONS

| | | | |
|---|---|---|---|
| 847,656 | 9/1960 | Great Britain | 214/132 |

*Primary Examiner*—Gerald M. Forlenza
*Assistant Examiner*—John Mannix
*Attorney*—Floyd B. Harman

[57] ABSTRACT

There is disclosed a control circuit for actuating a hydraulically actuated boom and a hydraulically actuated implement associated with an earth-working mechanism whereby the actuation of the boom and the implement may be initiated solely by the closing of an electrical switch thereby enabling the operator of the earth-working mechanism to retain both hands on the steering wheel except for the short period of time when the switch is actuated. The control circuit comprises a first electrical circuit for automatically raising the boom and the implement, a second electrical circuit for automatically and continuously orienting the implement in a predetermined relationship with the boom, a third electrical circuit for automatically rotating the implement from a first position to a second position and wherein the third electrical circuit includes means for maintaining the implement in the second position for a preselected period of time and then automatically returning the implement to the first position, a fourth electrical circuit for lowering the boom and the implement, a fifth electrical circuit for automatically orienting the implement in a preselected angular relationship with the surface upon which the earth-working mechanism is located, and a sixth electrical circuit adapted to enable the boom and the implement to follow the surface upon which the earth-working mechanism is located. Each of these electrical circuits may be enabled in a preselected sequence by merely closing a switch which is located within easy access to the operator of the earth-working mechanism and in addition, a manual override control is available so that the operator may manually operate the boom and the implement in a conventional manner.

10 Claims, 7 Drawing Figures fig. 2.

CONTROL CIRCUIT FOR FRONT END LOADER

BACKGROUND OF THE INVENTION

Conventional material handling mechanisms, such as a tractor-loader having a digging bucket mounted on a boom, provide separate controls for independent operation of the actuators controlling the bucket and the boom. During a working cycle of these conventional loaders, the operator must concentrate on the manipulation of both controls, thus, diverting his attention from other operations such as the control of engine speed, steering and braking. It has, therefore, been desirable to provide a material handling mechanism which will be largely automatic in operation and free the operator to direct his attention for the operating of other vehicle controls.

One such device is disclosed in a U.S. Pat. application filed by Michael H. Canning, Ser. No. 871,790, which was filed on Oct. 31, 1969, and was assigned to the International Harvester Company. In this application, the operator of the earth-working mechanism is able to control the boom and the implement through the manipulation of a single control device. Through the use of a hydraulically controlled mechanical linkage, the bucket will automatically orient itself in a predetermined relationship with respect to the boom.

A second automatic control system for an earth-working mechanism is disclosed in a U.S. Pat. application filed by Ernest C. Carlson, et al., Ser. No. 887,013, which was filed on Dec. 22, 1969, and was assigned to the International Harvester Company. In this application, an earth-working vehicle, more particularly a back hoe, utilized a wheatstone bridge circuit for the control of a boom and a back hoe implement. The Carlson et al. device provides a single lever control system for material handling in which the single control lever controls a plurality of directional flow control valves and hydraulic motors which in turn control the boom and the implement.

SUMMARY OF THE INVENTION

The general purpose of this invention is to provide a control circuit for an earth-handling apparatus which embraces all of the advantages of similarly employed devices and to additionally provide functional capabilities resulting in reduced cycle time and less operator fatigue with relatively inexpensive semi-automatic controls. To attain this, the present invention contemplates a control circuit for actuating a boom and an implement in a preselected sequence of operation whereby the operator need only actuate a switch in order to initiate the several operations and need not continually control a control lever. The control circuit comprises a plurality of electrical circuit means each initiated by a control switch located within easy reach of the operator. The control system comprises a first electrical circuit for automatically raising the boom and the implement of the earth-working mechanism, a second electrical circuit for automatically and continuously orienting the implement in a predetermined relationship with the boom, a third electrical circuit for automatically rotating the implement from a first position to a second position and wherein the third electrical circuit maintains the implement in the second position for a preselected period of time and then automatically returns the implement to a first position, a fourth electrical circuit for lowering the boom and the implement, a fifth electrical circuit for automatically orienting the implement in a preselectable angular relationship with the surface upon which the earth-working mechanism is located, and a sixth electrical circuit means adapted to enable the boom and the implement to follow the contour surface upon which the earth-working mechanism is located. The control circuit further comprises means for automatically raising the boom to a preselectable height, means for automatically lowering the boom to any preselectable height including ground level, means for automatically preselecting the angular relationship of the implement with respect to the surface upon which the earth-working mechanism is located, i.e., the dig angle, and means for automatically enabling the boom to follow the contour of the earth at any height of the boom and the implement, i.e., a float condition.

It is, therefore, an object of the present invention to provide a control circuit for improving cycle time of an earth-handling apparatus.

Another object is to provide a control circuit for an earth-working mechanism which enables the operator to simply control the implement and the boom operation by merely actuating a switch, thus, freeing the operator to direct his attention to other controls on the vehicle, e.g., engine speed, steering and braking.

A further object is to provide a control circuit for an earth-working mechanism which enables the operator to control the boom and the implement automatically in a selected sequence as determined by a preset program.

Still another object is to provide a control circuit for an earth-working mechanism which enables the boom and the implement to be raised or lowered to predetermined positions and which enables the implement to be rotated through a predetermined angle.

Yet another object is to provide a control circuit for an earth-working mechanism which electrically controls the position of the implement with respect to the position of the boom.

A still further object is to provide a control circuit for an earth-working mechanism which includes an electrical return to dig control and an electrical self-leveling control.

A still further object is to provide a control circuit for an earth-working mechanism which includes a neutrally biased switch having circuit holding means actuating and automatically effecting a work cycle, thus permitting little operator attention.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
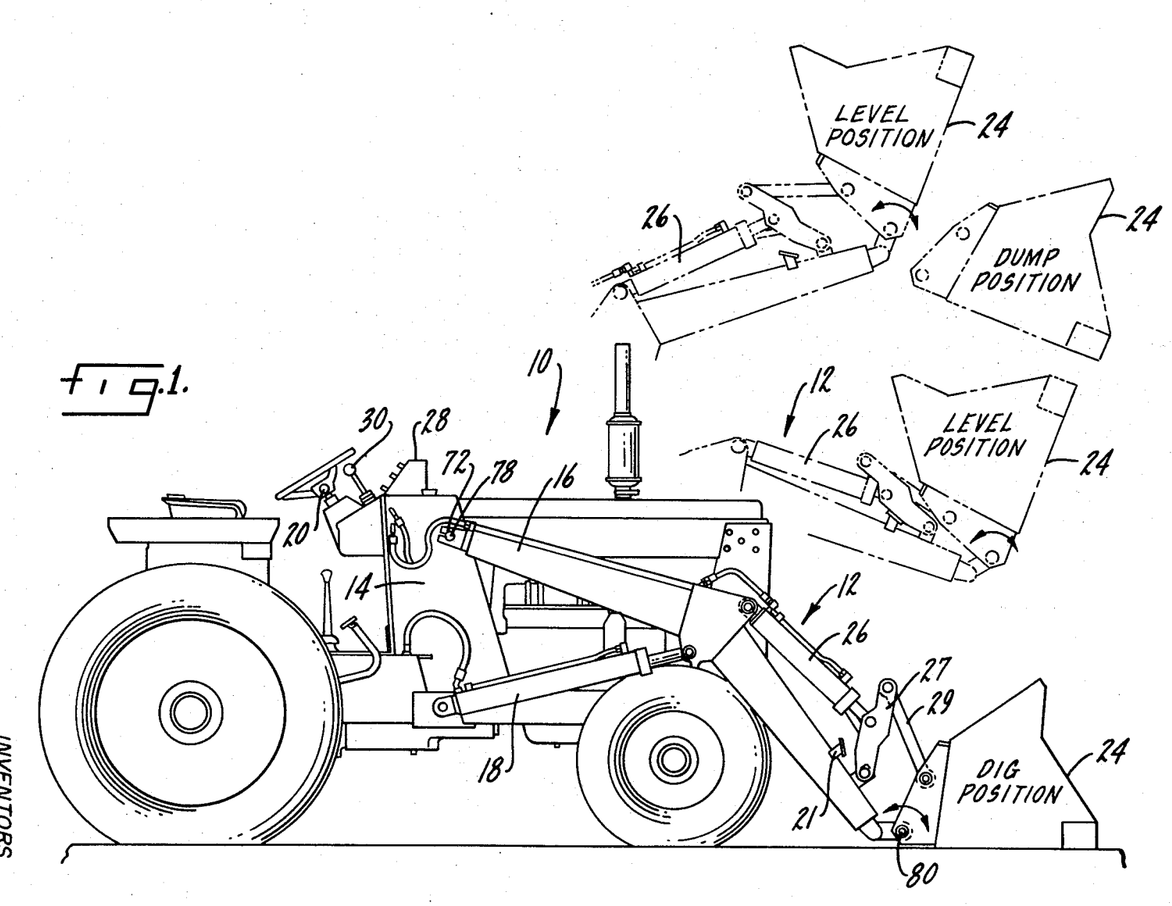
FIG. 1 is a side elevational view, partially cut away for clarity, illustrating a material handling mechanism embodying features of the present invention.

Referring now to the drawings wherein like reference characters designate like or corresponding parts throughout the several views, there is shown in FIG. 1 a material handling vehicle 10 of the front end loader type. It is understood that the invention has application in other vehicles such as loggers or similar equipment employing a plurality of actuators controlling different mechanisms. Vehicle 10 comprises a conventional loader assembly 12 mounted on a frame 14. The loader assembly 12 includes a pair of boom arms 16 pivotally mounted on the frame 14 and is adapted to be adjusted vertically relative to the vehicle 10 by a pair of hydraulic boom cylinders 18. The boom cylinders 18 are controlled by the operator through the actuation of a neutrally biased tap switch 20 including a lever 19 (FIG. 2) mounted within easy reach of the operator. Attached to the boom arm 16 is a pair of boom follower potentiometers 72 and 78. As the position of the boom arm 16 changes, the setting of each of these potentiometers is adapted to change proportionally. As will be explained below, the potentiometers 72 and 78 will always be indicative of the instantaneous position of the boom arm 16. A bucket 24 is pivotally mounted to one end of each of the boom arms 16. Attached to each boom arm 24 is a stop 21 which acts to limit the amount of bucket roll back as will be described below. The bucket 24 is adapted for both vertical movement and rotary movement. Several positions through which the bucket 24 and the boom 16 travel are illustrated in FIG. 1. Connected to the bucket is a bucket follower potentiometer 80. As the angular position of the bucket 24 changes, the setting of the potentiometer 80 is adapted to change proportionally. As will be explained below, the setting of this potentiometer 80 will always be indicative of the instantaneous angular position of the bucket 24.

Movement of the bucket 24 from its lowermost or dig position to its uppermost level or dump position, as illustrated in FIG. 1, is controlled by a pair of bucket cylinders 26 operating in conjunction with the boom cylinders 18. The bucket cylinders 26 are each attached to a bucket amplifying link 27 which in turn is connected to a bucket link 29 and then to the bucket 24. The bucket cylinders 26 and the boom cylinders 18 may be selectively actuated by an electronic control circuit 50 (FIGS. 3-5) whereby the position of bucket 24 may be automatically and continuously oriented in a predetermined relation with respect to the boom 16. More particularly, in the preferred embodiment, the bucket 24 remains in its level position with respect to the boom 16. The angle of the bucket 24 with respect to the ground may be changed by the operator through the actuation of the tap switch 20. When the bucket 24 has reached the uppermost level or dump position, the operator need only actuate the tap switch 20 and the bucket 24 will rotate clockwise from the uppermost level position to the dump position shown in FIG. 1, to dump the load, and will then automatically rotate counter clockwise and return to its original position. Similarly, the bucket 24 may also be rotated in order to change its dig angle with respect to the ground merely by actuating the tap switch 20. In addition to the tap switch 20, a manual control lever 30 is provided. If the operator so chooses, the above boom and bucket operations may be manually controlled through the use of the manual control lever 30.

In addition to the tap switch 20 and the manual control lever 30, there is also a control panel 28. These features may be more clearly seen with reference to FIG. 2. Mounted on control panel 28 is a boom raise limit controller 32, a boom lower limit controller 34 and a bucket dig angle controller 36. The boom raise limit controller in the preferred embodiment constitutes a potentiometer and as will be explained hereinafter, is used by the operator to set the maximum height to which the boom and implement will be automatically raised upon actuation. To accomplish this, the operator merely turns the indicator dial 31 of the raise limit to the preselected height indicated on a calibrated scale 31' and then actuates the tap switch 20. Similarly, the boom lower limit controller 34 in the preferred embodiment may also comprise a potentiometer having a dial 33 and a calibrated scale 33' which is preset by the operator to determine the lower limit to which the boom and the implement shall be lowered. Lastly, the bucket dig angle controller 36 may, in the preferred embodiment, comprise a potentiometer having a dial 35 and a calibrated scale 35' and is presettable by the operator to determine the dig angle of the implement or bucket with respect to the ground upon which the vehicle 10 is located. The control panel 28 also comprises an emergency stop switch 38 with which the operator may immediately halt any movement of the boom and bucket by merely actuating the switch 38.

If the operator desires to manually raise or lower the boom 16, he may utilize the manual control lever 30 (which acts to override the automatic operation) to raise or lower the boom 16. Similarly, the bucket 24 may also be manually controlled through the use of the manual control lever 30.

Figure 2:
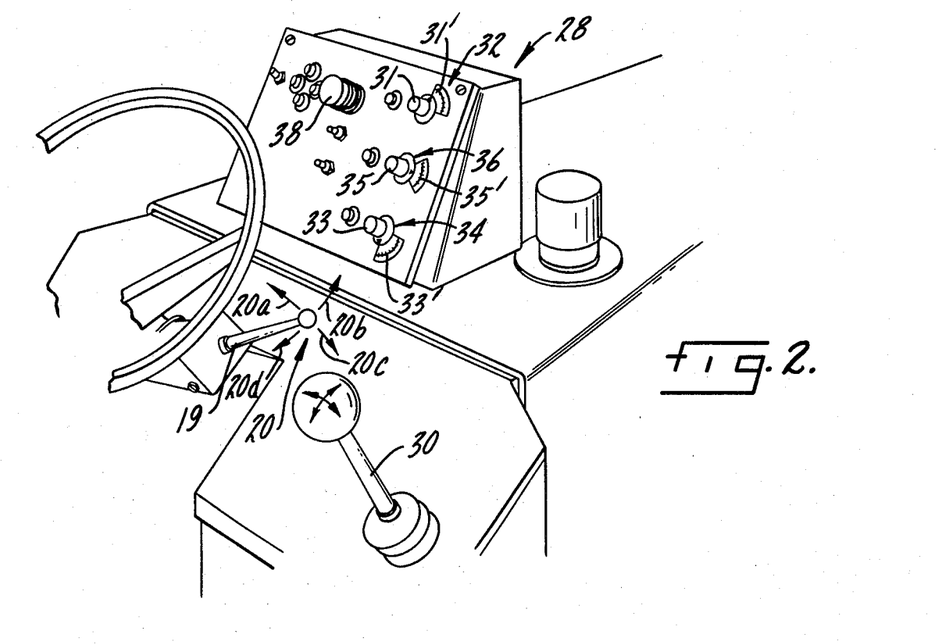
FIG. 2 is a perspective view of the control panel of the earth-working mechanism shown in FIG. 1.
Figure 3:
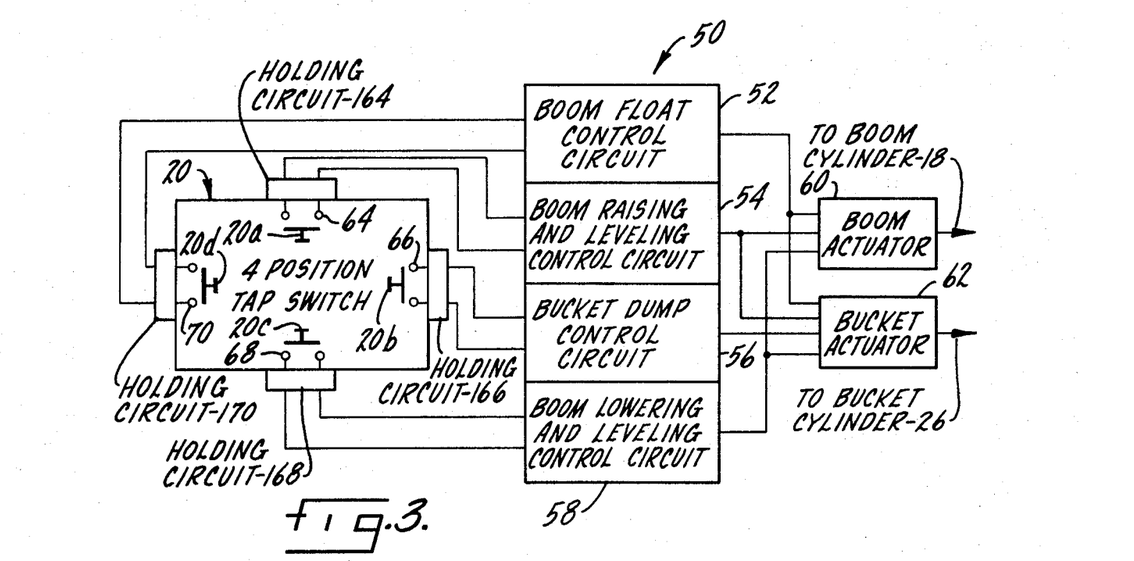
FIG. 3 is a block diagram of a control circuit for the invention of FIG. 1.

Referring now to FIG. 3, there is shown a block diagram of a control circuit 50 for implementing the automatic movement of the boom 16 and the bucket 24. The control circuit 50 comprises a four position tap switch 20, a boom float control circuit 52, a boom raise and level control circuit 54, a bucket dump control circuit 56, and a boom lower and level control circuit 58. As will be described hereinafter, the output from the boom float control circuit 52, the boom raise and level control circuit 54, and the boom lower and level control circuit 58 are connected to a boom actuator 60 which in turn is operably connected to the boom cylinders 18 (FIG. 1). The output from each of the control circuits 52, 54, 56 and 58 are electrically connected to a bucket actuator 62 which is operably connected to the bucket cylinders 26. The control circuit 50 is designed so that merely actuating the neutrally biased tap switch 20 into one of the four positions corresponding to the arrows shown in FIG. 2 and designated by the numerals 20a–20d, the operator may selectively actuate any of the control circuits 52 through 58. For example, by momentarily actuating tap switch 20 in its upper position 20a, a pair of contacts numerically designated as 64 are closed thereby actuating the boom raise and level control circuit 54. As will be described hereinafter, the momentary closure of the switch contacts 64 establishes an electrical switch holding circuit (diagrammatically shown as 164 in FIG. 4A and schematically in FIG. 5B) which in turn actuates the boom raise and level control circuit 54, thereby allowing the operator to immediately release the lever 19 (FIG. 2) controlling the tap switch 20. In response to the closure of switch contacts 64, the boom raise and level control circuit will supply an electrical signal to the boom actuator 60 and to the bucket actuator 62. At this time, the bucket 24 will roll counter clockwise from its dig position shown in FIG. 1, and the bucket amplifier link 27 will come to rest against the stop 21. Simultaneously, the boom 16 will rise and the bucket 24 will begin to rotate clockwise to attain a level position with respect to the boom 16. Because of the preselection of the upper limit by the operator on the boom raise limit controller 32 (FIG. 2), the boom 16 will continue to raise until this preselectable height has been reached. Concurrently, after the initial roll back, the bucket 24 will remain level with the boom because the relative movement of the boom 16 will cause a corresponding signal to be generated controlling the movement of the bucket cylinder 26 and thereby controlling the movement of the bucket 24 as will be hereinafter described in reference to FIGS. 4 and 5.

After the boom 16 has raised to its upper level, the operator may then choose to dump the bucket by momentarily actuating the tap switch 20 into position 20b thereby closing contacts designated as numeral 66. This de-energizes holding circuit 164 and energizes a holding circuit diagrammatically shown as 166 in FIG. 4B and schematically in FIG. 5B, thereby enabling the operator to release the lever 19. An electrical signal will be transmitted to the bucket actuator 62 which will cause the bucket 24 to rotate from the upper limit position shown in FIG. 1 to a second or dump position as indicated by the arrows. After reaching the second position, a time delay associated with the bucket dump control circuit 56 will insure that the bucket 24 remains in the second position a preselectable period of time and will then automatically revert to the first position. Next, the operator may momentarily actuate tap switch 20 into position 20c, thus de-energizing holding circuit 166 and closing contacts designated as 68 and its associated holding circuit diagrammatically shown as 168 in FIG. 4B and schematically in FIG. 5B. This will cause the boom 16 and bucket 24 to lower to the preselectable height set by the operator on boom lower limit control 34 (FIG. 2) in a manner similar to that described in relation to the boom raise and level circuit 54. When the bucket 24 and boom 16 have reached this preselectable lower limit, the bucket 24 will automatically orient itself with regard to a preselectable dig angle selected by the operator by setting the bucket dig angle controller 36 (FIG. 2). Lastly, the operator may then again momentarily actuate the tap switch 20 into position 20d (which does not de-energize holding circuit 168) closing the switch contacts 70 and its additionally energizing associated holding circuit diagrammatically shown as 170 in FIG. 4B and schematically in FIG. 5B, which will actuate the boom float control holding circuit 170 and SCR 132. The boom float control holding circuit 170 is adjusted so that the bucket may freely follow the contour of the ground as the vehicle 10 is in motion. While the operation of the control circuit 50 has been described in sequence, it will be recognized that the operator may actuate tap switch 20 in any of the indicated directions, in any sequence, to selectively actuate the associated control circuit and the actuation need not be in the order that has been described above.

Figure 4A:
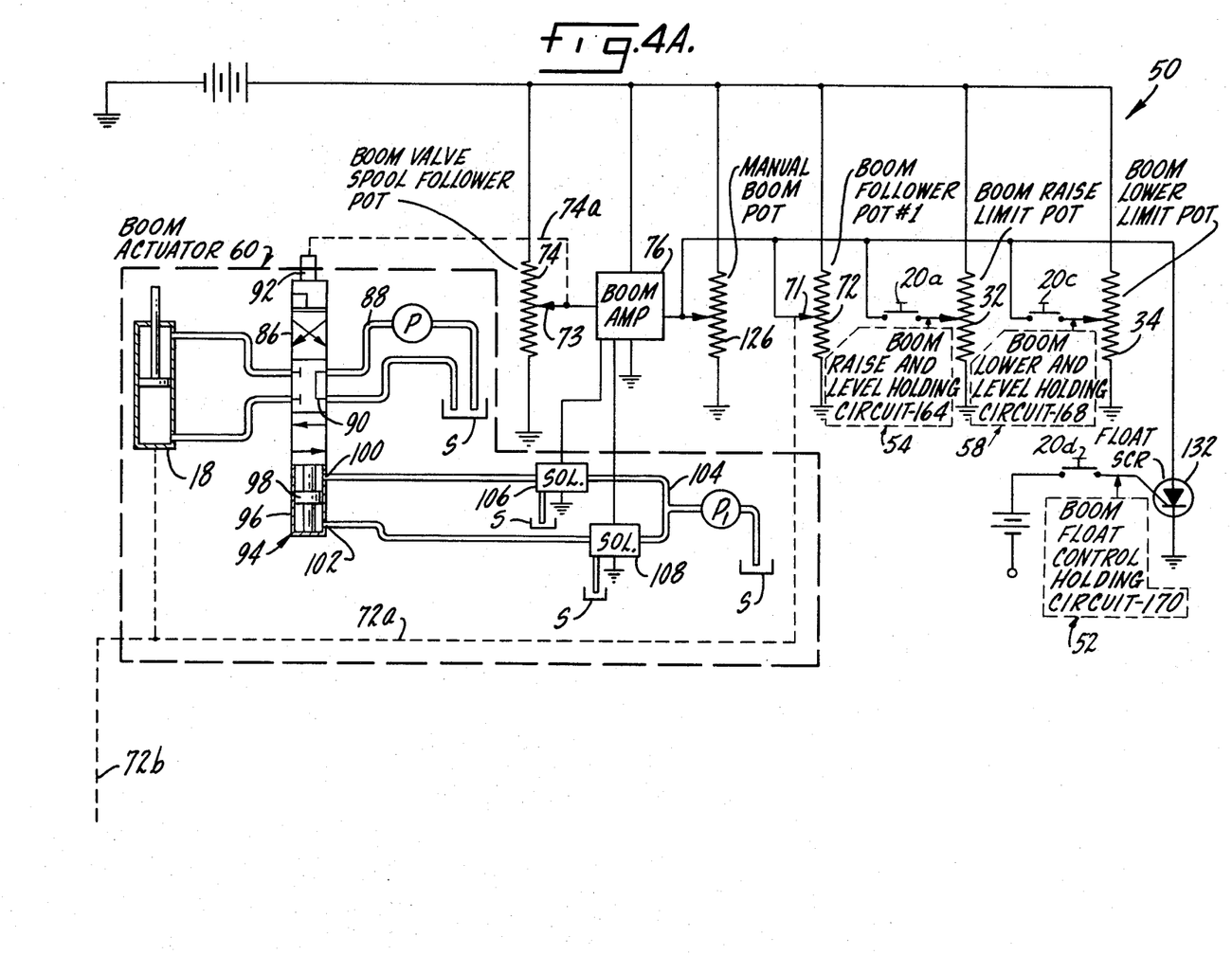
FIGS. 4A and 4B are a simplified or skeletal schematic diagram of a control circuit shown in the block diagram of FIG. 3.
Figure 4B:
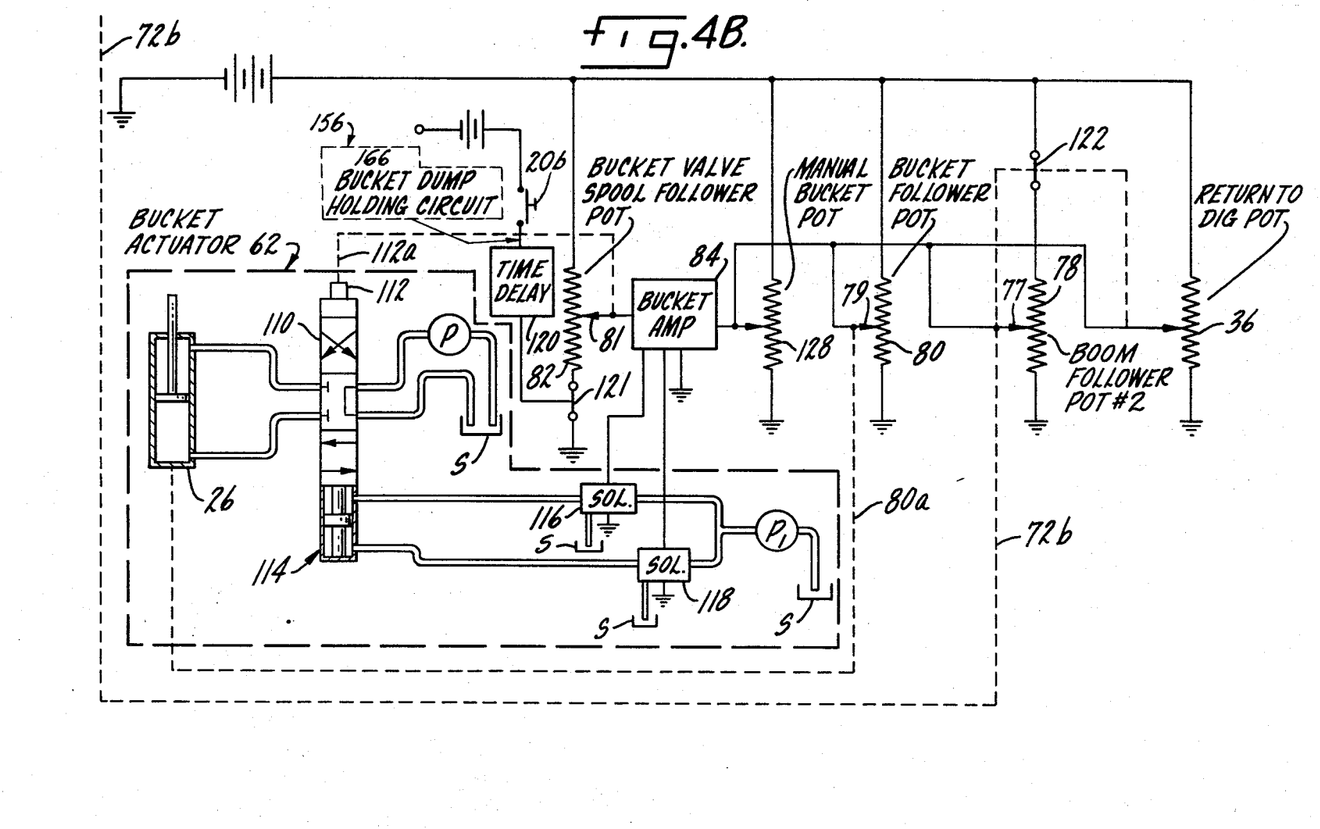

Referring now to FIGS. 4A and 4B, there is shown a simplified skeletal schematic view of the block diagram control circuit 50 shown in FIG. 3 which constitutes the preferred embodiment of the invention. It will be recognized by referring to both FIGS. 3 and 4 that control circuit 50 is operable in four separate control modes, namely, the raise and level mode, the lower and level mode, the bucket dump mode, and the boom and bucket float mode. FIG. 4 clearly shows that several portions of the individual control circuits 52, 54, 56 and 58 employ certain common circuit elements. However, it will be recognized by one skilled in the art that common circuit elements need not be used for each of these circuits and that individual elements may be employed. For clarity, the sequence of operation of the control circuit 50 will be described in terms of the operator desiring to raise the bucket from its lowermost position shown in FIG. 1, to its uppermost position and then returning the bucket to its lowermost position once again.

Referring now to FIGS. 4A and 4B, control circuit 50 when operating in its boom raise and level control circuit mode 54 comprises the boom raise limit control or potentiometer 32, located on the control panel 28 (FIG. 2), a first boom follower potentiometer 72 or pot No. 1, a boom valve spool follower potentiometer 74, a boom amplifier 76, a second boom follower potentiometer 78 or pot No. 2, a bucket follower potentiometer 80, a bucket valve spool follower potentiometer 82, a bucket amplifier 84, and a manual boom potentiometer 126. The wiper arms of the first boom follower potentiometer 72, boom raise limit potentiometer 32, boom valve spool follower potentiometer 74 and the manual boom potentiometer 126 are arranged in such a manner so as to form a wheatstone bridge arrangement with respect to boom amplifier 76. This arrangement has similarities to the arrangement disclosed in the Carlson application Ser. No. 887,013 referred to above. Similarly, the wiper arms of the second boom follower potentiometer 78, the bucket follower potentiometer 80, the bucket valve spool potentiometer 82 and the manual bucket potentiometer 128 are arranged in a wheatstone bridge relationship with respect to bucket amplifier 84. Connected to one output of boom amplifier 76 and bucket amplifier 84 are boom actuator 60 and bucket actuator 62, respectively. Boom actuator 60 comprises a hydraulic control valve 86 which is used to effectuate the movement of the boom cylinders 18 in a conventional manner. A pump P delivers fluid from a reservoir S to hydraulic control valve 86 through a conduit 88. This fluid is then directed to an open center passage 90 and then would normally flow out of the valve and back to a sump. As more fully disclosed in U. S. Pat. No.

2,873,762, a spool 92 is reciprocal within the hydraulic control valve 86 whereby reduced diameters of the spool in conjunction with various lands and portings will control the direction of fluid flow to and from the boom cylinder 18 in a conventional manner.

Movement of the spool 92 of the hydraulic control valve 86 is controlled by a servo-motor 94 and includes a housing 96 connected to the hydraulic control valve 86. A piston element 98 is attached to the spool 92 whereby an unbalance of fluid energy delivered through a port 100 or a port 102 is effective to cause reciprocation of the piston 98 and the spool 92 to control the direction of fluid flow to the boom cylinder 18. Fluid is supplied to the servo-motor 94 from a pump P1 delivering fluid through a conduit 104 to solenoid operated valves 106 and 108. These solenoid valves may be a conventional "normally open" three-way valve in which the fluid is normally directed through the valve to the ports 100 and 102 of the servo-motor 94 but upon selective actuation, they will dump fluid on the appropriate side of piston 98 to sump S whereby the normal pressure on the opposing side of the piston will cause the spool 92 to reciprocate.

For controlling actuation of the solenoid valve 106 or 108 and consequent actuation of the spool 92, an electronic bridge circuit is interposed between the tap switch 20 and the spool 92 of the control valve 86. As described above, the bridge circuit comprises the boom follower potentiometer 72 placed in parallel with the boom raise limit potentiometer 32. The boom follower potentiometer 72 is physically located at one end of the boom arm 16 (FIG. 1) and the position of this potentiometer is indicative of the angular position of the boom arm 16. This indication is effected by the movement of the wiper arm 71 which responds to the movement of the boom arm 16. Since the position and movement of the cylinder 18 directly reflects the position and movement of the boom 16, this movement is schematically represented by broken line 72a. The valve spool follower potentiometer 74 is physically located on the spool 92 and movement of the spool 92 causes movement of a wiper arm 73 of the boom valve spool follower potentiometer 74 as indicated by the broken line 74a. The boom amplifier 76 may comprise a conventional differential amplifier functioning as a comparator and compares the voltage difference between the potentiometer 74 and the potentiometers 72 and 32. Accordingly, when the switch contact 64 of the tap position switch 20a is closed by the operator, thus closing switch holding circuit 164, the boom control amplifier 76 will detect an unbalance signal across the output of the wheatstone bridge since the effective impedance of potentiometers on either side of the boom control amplifier 76 differ. This unbalance results in an output signal from the boom control amplifier 76 which in turn actuates solenoid valve 106 thereby causing the spool 92 to be moved. This downward movement of the spool 92 will deflect the wiper arm 73 of the boom valve spool follower potentiometer 74, changing the impedance of the bridge and simultaneously directing fluid to the head end of boom cylinder 18, thereby simultaneously raising the boom arm 16 and causing the movement of wiper arm 71 of the boom follower potentiometer 72. This movement continues causing a series of null or balance conditions of the bridge due to the changing positions of wiper arms 71 and 73. The final null or balance condition is determined by the operator through the position set on boom raise limit controller or potentiometer 32. At this final null position, spool 92 will attain its neutral position thereby stabilizing cylinder 18 and thus preventing boom arm 16 from raising any further. Thus, the movement of the boom cylinder 18 and the corresponding movement of the boom arm 16 is directly controlled by the setting of the boom raise limit potentiometer 32 by the operator. In summary, the boom valve spool follower potentiometer 74 senses the linear position of the spool 92 and as the boom arm 16 begins to raise as a result of the closure of the contacts 64, by tap switch 20a, the potentiometer 74 tries to seek the null position set by the boom raise limit potentiometer 32. When this null position is obtained, spool 92 will be in its neutral position, thus stopping the movement of the boom arm 16. Concurrently with the movement of the boom 16, there is also movement of the bucket 24 as will now be explained.

Connected in tandem with the first boom follower potentiometer 72 is the second boom follower potentiometer 78. The second boom follower potentiometer 78 also moves in response to the movement of the boom arm 16 and the boom cylinder 18 (indicated by broken line 72b) and forms one portion of the bridge circuit associated with the bucket amplifier 84. The bucket amplifier 84 and its associated circuitry is used as a levelling circuit for levelling the bucket 24 with respect to the position of the boom arm 16. Rotary movement of the bucket 24 is controlled by the bucket cylinders 26. The bucket cylinders 26 are controlled by a second hydraulic control valve 110 which is identical to the hydraulic control valve 86. The hydraulic control valve 110 includes a valve spool 112 which reciprocally moves with respect to the hydraulic control 110. Associated with the spool 112 is the bucket valve spool potentiometer 82 and its associated wiper arm 81. As with regard to spool 92, the wiper arm 81 of the valve spool potentiometer moves in proportion to the movement of the spool 112, schematically denoted by the broken line 112a. An electrical signal indicative of the rotary position of the bucket 24 is provided by the bucket follower potentiometer 80 which is physically located at the rotary connection between the bucket arm 22 and the bucket 24 (FIG. 1). Movement of the bucket cylinders 26 cause a rotary movement of bucket 24 and the wiper arm 79 of the bucket follower potentiometer 80, schematically indicated by broken line 80a. As will become clear below, the initial setting of the bucket follower potentiometer 80 is set such that a small voltage differential is present when the bucket is in its dig position as shown in FIG. 1. Thus, an unbalance of the bucket bridge circuit is initially present.

The control of the hydraulic control valve 110 is similar to the control described with regard to the hydraulic control valve 86. Movement of the spool 112 is controlled by a servo-motor 114 connected to a pair of solenoids 116 and 118. Actuation of solenoids 116 and 118 are controlled by the output of the bucket amplifier 84 which comprises a differential amplifier. By selectively energizing the solenoids, 118 and 116, the spool 112 may be moved upwards or downwards, respectively, thereby causing the bucket to rotate rearwardly or forward as shown in FIG. 1 correspondingly moving the position of the bucket cylinder 26 in accordance therewith. When the operator closes switch contact 64 of the tap switch 20a, thus closing the switch holding circuit 164, boom 16 begins to raise in response to unbalance occurring across the boom amplifier 76 described above. Simultaneously, because of the initial voltage differential across potentiometer 80, the bucket 24 will immediately roll back in an attempt to balance the bridge circuit and return spool 112 to its neutral position. This roll back is physically limited by the stop 21 coming in contact with the amplifying link 27. As the boom arm 16 continues to raise, the movement of the boom arm 16 causes the movement of the wiper arm 77 of the boom follower potentiometer 78 as indicated by the broken line 72b. This again changes the impedance of the bucket bridge circuit and causes an unbalance to occur in the bridge circuit. This unbalance results in a signal output from the bucket amplifier 84 which actuates solenoid 116 which then causes the downward movement of the spool 112, thus causing the bucket to rotate forward, away from the stop 21. This in turn moves wiper arm 81 of the bucket valve spool follower potentiometer 82 (as indicated by the broken line 112a) in an attempt to balance the bridge circuit and seek a null position for bucket spool 112. Thus, after the initial bucket roll back, a fixed relationship exists between the position of the bucket 24 and the position of the boom arm 16.

When the boom arm 16 finally reaches the level set by the operator on boom raise limit potentiometer 32, a final balance will be achieved and there will be no voltage differential across the boom amplifier 76 nor across the bucket amplifier 84 and both the boom arm 16 and the bucket 24 will come to rest at the upper position shown in FIG. 1.

Figure 5A:
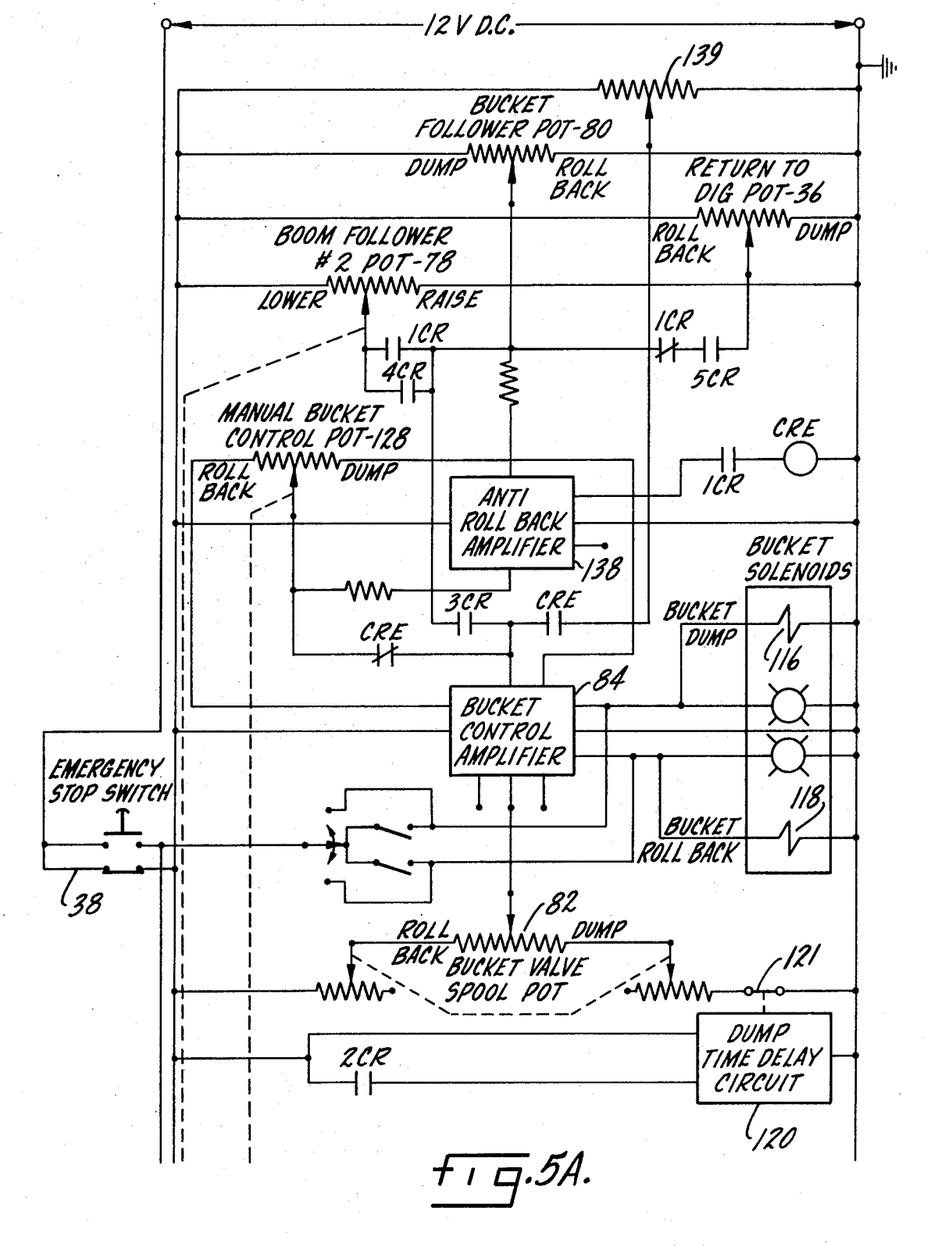
FIGS. 5A and 5B are a complete schematic diagram of the control circuit for the invention of FIG. 1 and constitutes the preferred embodiment of the invention.
Figure 5B:
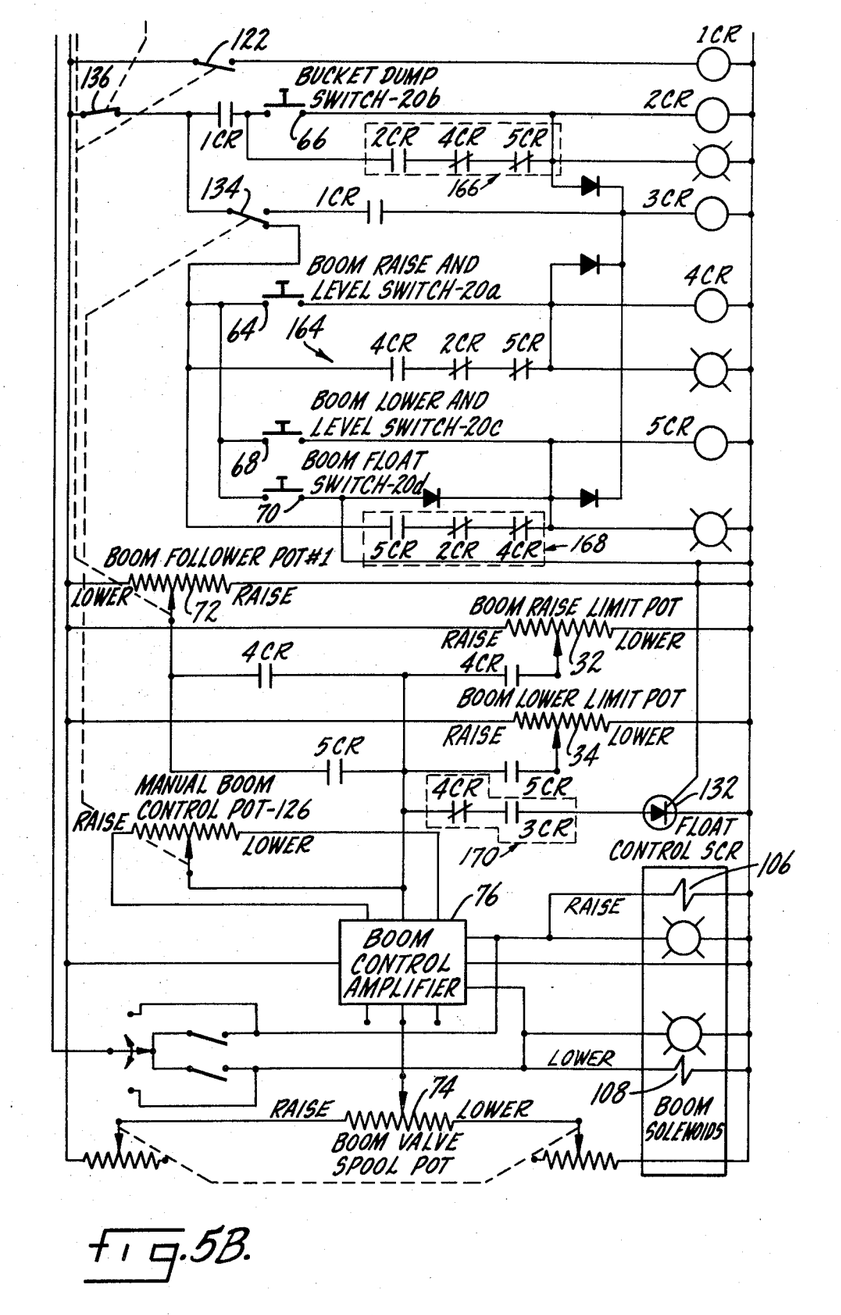

At this point, the operator is ready to dump the load which is in the bucket 24. This may be accomplished by closing the bucket dump switch contact 66 of the tap switch 20b. This de-energizes holding circuit 164 and energizes holding circuit 166. Thus, as seen in FIGS. 4 and 5, this causes a new bridge configuration with respect to the bucket amplifier 84. The closure of holding circuit 166 inserts a time delay circuit 120 into the bridge configuration. The time delay circuit 120 causes switch contacts 121 to open for a preselected period of time sufficient to ensure the complete dumping of the bucket load. The opening of contacts 121 causes an impedance unbalance in the bucket bridge circuit. The bucket amplifier 84 senses this new impedance unbalance and attempts to adjust therefor. Because of the unbalance, solenoid 116 is energized, thereby moving the spool 112 and causing the bucket to rotate (clockwise in FIG. 1) from a first position to a second or dump position. At this point, the boom circuitry has no effect since it is in complete balance and the boom follower potentiometer 78 remains stationary. Thus, the bucket valve spool follower potentiometer 82 attempts to balance itself with respect to the impedance of the bucket follower potentiometer 80. As the spool 112 moves in an attempt to balance the bridge circuit, the bucket 24 rotates in response to the movement of the bucket cylinder 26, thereby dumping its load. At this time, the time delay circuit 120 closes switch contact 121, thereby causing another unbalance in the circuit. The bucket cylinder 26 returns to its original position to again balance the bridge circuit. This causes a rolling back of the bucket to the position shown in FIG. 1. It will be recalled that this is the same position that the bucket was in prior to the initiation of the dump.

After the bucket 24 has dumped, the operator may then lower the boom and bucket by closing switch contact 68 of the tap switch 20c. This closure causes the opening of the holding circuit 166 and the closure of holding circuits 168 and 170 thereby inserting the boom lower limit potentiometer or controller 34 into the bridge circuit. The boom raise switch holding circuit 164 is now open, the boom raise limit potentiometer 32 is no longer in the circuit and except for this change, the boom lower and level control circuit mode is identical to the boom raise and level control circuit mode described above. As the switch contact 68 and its associated holding circuit 168 is closed, the boom, therefore, beings to lower to seek the lower limit set by the operator on the boom lower limit potentiometer 34. As the boom arm 16 is lowering in response to the movement of the spool 92 and the boom cylinder 18, the bucket is also lowering and in attempting to find its impedance balancing position, thereby remaining level. One additional modification to the circuit, however, has been made. As the boom 16 is lowering and reaches a preselected position (e.g., 2 feet above the ground), a plurality of switching occurs and as schematically represented by the switch 122 which may be physically associated with the boom arms. The switch 122 opens and disconnects the boom follower potentiometer 78 from the bucket control circuit 24 and the boom lower and level holding circuit 168 (FIGS. 5A and 5B) substitutes the bucket dig angle controller or potentiometer 36 into the bridge circuit. It will be recalled that this potentiometer is also present on the control panel 28 in FIG. 2. Because potentiometer 36 has been inserted in place of potentiometer 78, a new impedance unbalance occurs across the bucket amplifier 84 and this causes the bucket to rotate to a position or angle with respect to the ground, to match the setting on the potentiometer 36 as set by the operator. This angle is known as the dig angle. Finally, when the level set on the boom lower limit potentiometer 34 has been reached, a complete balance will occur across both the boom amplifier 76 and the bucket amplifier 84, thereby causing the boom 16 and the bucket 24 to come to rest.

The last sequence of operation performed by the operator would be to place the bucket and boom into the float control mode. This is accomplished by closing switch contact 70 of the tap switch 20d, thus closing switch holding circuit 170. When this occurs, a silicon control rectifier 132 is gated thereby placing one input terminal of the boom amplifier 76 at ground potential. This immediately causes an unbalance condition to be sensed by the boom amplifier 76. Because the silicon control rectifier grounds the boom amplifier 76, an uncorrectable unbalance condition occurs and this causes the boom valve spool 92 to go to its extreme or float condition through the actuation of solenoid 106, thereby enabling the boom cylinder 18 and the boom arm 16 to merely float and follow the contour of the ground. The float condition may be cancelled by the operator by again closing switch contact 64, thereby starting the boom raise and level cycle again.

In addition, the operator may disconnect the automatic circuitry which has heretofore just been described and control the boom or the bucket by utilizing the single lever 30 in a manner similar to that described in the Carlson application Ser. No. 887,013. Whenever lever 30 is actuated, any of the automatic holding circuits 164, 166, 168 and 170 which had been energized, are automatically de-energized with the exception that the automatic leveling circuit becomes inoperative only when the bucket is being operated manually or when boom is below the height set by switch 122. By referring to FIG. 4, it can be seen that the manual boom potentiometer 126 and the manual bucket potentiometer 128 are always in the bridge circuit; however, because their position is always stationary, they have no effect in the automatic operation and in the change of impedance which is occurring. When the operator begins to actuate the lever 30 which controls both the manual boom potentiometer 126 and the manual bucket potentiometer 128, this causes an unbalance condition to occur in the bridge circuit and the respective spool 92 and 112 move to compensate for this unbalance in a manner described in the above mentioned Carlson application.

Referring now to FIGS. 5a and 5b, the complete electronic circuitry of the control system 50 as described in conjunction with FIG. 4, is shown. To start operation, the operator would momentarily close boom raise and level switch 64 of the tap switch 20a. This activates relay 4CR which closes relay contact 4CR and energizes the holding circuit 164. Since relay 3CR is also associated with tap switch 20a and holding circuit 164, relay coils 3CR and 4CR throughout the circuit are either de-energized or energized which in turn close or open their associated contacts which are identically numbered to correspond with the particular relay which is controlling them. The relay controlled contacts or coils, such as 4CR and 3CR, are shown throughout the circuitry as either closed, i.e., a slanted bar spanning two vertical bars, or open, i.e., two spaced apart vertical bars. An indicator light is shown in each of the relay activated holding circuits as a circle with four bars radiating therefrom. Closing the contacts 64 establishes the circuit described above with regard to FIG. 4 and causes the bucket 24 to first roll back and then simultaneously cause the boom 16 to begin raising with the bucket following the boom trying to reach the level set by the boom raise limit potentiometer 32. When this level is reached, the spools 92 and 112 will be in their neutral position, thus causing the boom to stop raising. At this point, we are ready to go into the second sequence of operation; namely, the dump sequence.

The operator now momentarily depresses bucket dump switch 20b closing contacts and activating relay 2CR which energizes and closes the open relay contact 2CR in the holding circuit 166 and energizes the holding circuit 166 the closed relay contact 2CR in holding circuit 164 opens and de-energizes holding circuit 164. Relay 2CR when energized closes and opens the associated 2CR contacts or coils throughout the circuitry. Since relay 3CR is also associated with tap switch 20b and holding circuit 166, relay coil 3CR remains energized and actuates its associated contacts. This then sets up the conditions described above with regard to FIG. 4 for the dump circuit. The energization of relays 2CR and 3CR actuates the dump time delay and relay circuit 120 which in turn opens switch contact 121 for a preselected period of time sufficient to ensure the complete dumping of the bucket load. The opening of contacts 121 causes an impedance unbalance in the bridge circuit which causes the bucket 24 to rotate clockwise and to dump as described above. After the time delay has been completed, switch contact 121 is closed, thereby causing the bucket to rotate counter clockwise to its original position.

In the next sequence of operation, the operator momentarily depresses boom lower and level switch 20c closing switch contact 68 and activating relay 5CR which closes the open relay contact 5CR in holding circuit 168 and energizes holding circuit 168 and de-energizes holding circuit 166 by de-energizing relay contact, in holding circuit 166. Since relay 3CR is also associated with tap switch 20c and holding circuit 168, relay contacts or coils 3CR throughout the circuitry are either energized or de-energized as explained previously. This then sets up a condition of the boom lower and level control circuit which was described in connection to FIG. 4. Now, as the boom 16 is lowering, we finally reach the position which has been set by limit switch 122. As described above, this deactivates relay 1CR which disconnects the 1CR contact and its associated boom follower potentiometer 78 from the bucket control circuit and connects the 1CR contact in series with the activated 5CR contact and places the return to dig potentiometer 36 into the circuit. Below this level set by the limit switch 122, the automatic levelling circuit is no longer in effect since the second boom follower potentiometer has been disconnected. When the boom finally reaches the level set on the lower level potentiometer 34, the system has reached a null and the bucket has come to rest at this position. At this point, the driver may then put the automatic system into its float condition by momentarily pressing tap switch 20d which closes the contacts for boom float switch 70, which energizes relay coils 5CR and 3CR, if they are already not energized, forming the holding circuit 170. (They will have already been energized if the operator had just gone into the float control position from the lowering and levelling position just described. However, if the operator had gone into the float position from any other operating mode, these relays will have been energized by the closure of switch contact 70.) By closing switch contact 70, a pulse is also provided to the gate of the float control SCR 132 which grounds out one side of the boom control amplifier 76, thereby causing the boom valve spool 92 to go to its full extreme condition. This completes the operation of the automatic mode of the control circuit 50.

If manual control is desired, this may be accomplished by controlling the manual boom potentiometer 126 connected to the control handle 30. This repositions a limit switch designated by the numeral 134 which automatically isolates the boom raise switch contact 64, the boom lower switch contact 68, the boom float control switch contact 70 and their associated relays from the circuitry, thus, providing a potentiometer circuit for the boom amplifier circuit 76 which has the manual boom control potentiometer 126 as one input and the boom valve spool follower potentiometer 74 as the other input. This configuration enables manual raising or lowering of the boom 16. Similarly, a manual bucket control is provided. The manual bucket control potentiometer 128 is also connected to the manual control lever 30, and when it is operated, it completely disconnects all the automatic circuits from the control; namely, the bucket dump control circuit, the boom raise control circuit, the boom lower control circuit and the boom float circuit as well as the self-levelling circuit. This is accomplished by opening switch contact 136 which is connected to the manual bucket control potentiometer 128. The opening of switch contact 136 establishes a bridge control circuit associated with the bucket control amplifier 84 whereby the manual bucket control potentiometer 128 forms one input for the bucket control amplifier 84 and the bucket valve spool follower potentiometer 82 forms the other input. Thus, the bucket valve spool 112 is moved in order to seek a balance with the position of the manual bucket control potentiometer 128 as set by the operator with control lever 30.

Lastly, as an added safety feature for the manual mode of operation, an anti-rollback amplifier 138 is provided. The anti-rollback circuit comprises an anti-rollback differential amplifier 138 with a single output effective to close CRE, the manual bucket control potentiometer 128, and the parallel combination of the second boom follower potentiometer 78 and the bucket follower potentiometer 80. The anti-rollback amplifier 138 monitors the polarity between potentiometers 78, 80 and that of 128, and should this polarity become negative thus indicating undesirable rollback of the bucket (assuming a positive voltage under normal operating conditions) an output signal will be generated to close CRE. This relay causes the resistance 139 to be switched into bucket control amplifier 84, and control pot 128 to be switched out of the circuit. Accordingly, resistance 139 should have such magnitude so as to cause bucket amplifier 84 to center valve spool 112 thereby preventing the bucket from rolling back any further in response to manual control level 30. Such is effective to preclude the spilling of material from the bucket onto the tractor loader.

Thus, it can be seen that a complete automatic control circuit for an earth-working mechanism has been provided whereby the operator may effectuate all the automatic controls by merely momentarily closing a neutrally biased tap switch, thus, enabling him to devote his full attention to other operations such as the control of engine speed, steering and braking. It should be understood, of course, that the foregoing disclosure relates to only a preferred embodiment of the invention and that numerous modifications or alterations may be made therein without departing from the spirit and the scope of the invention as set forth in the appended claims. The anti-rollback feature and the electrical self-holding circuitry forms the subject matter of a co-pending application Ser. No. 112,536 titled "Control Circuit For Front End Loader" filed 2/4/71.

What is claimed is:

1. In a vehicle having an earth working mechanism including a hydraulically actuated boom and hydraulically actuated implement, a control circuit for actuating said boom and said implement comprising:

a first electrical circuit means, including a command means, first comparator means, and first, second and third variable impedances, for automatically raising said boom and said implement;

said command means including an electrical switch means and an electrical source wherein said actuation of said electrical switch means produces a signal adapted to automatically cause said boom to raise;

said first variable impedance associated with said boom and adapted to provide a first feedback signal indicative of the boom's position;

said second variable impedance associated with said boom and adapted to effectuate movement of said boom in response to said first electrical signal;

said first comparator means interconnected between said first variable impedance, said second variable impedance and said command means for detecting and amplifying an impedance unbalance between said first and second impedances in response to said actuation of said electrical switch, wherein said resultant unbalance produces said first electrical signal which effectuates the movement of said boom and wherein movement of said boom causes a change in said first feedback signal, thereby eliminating said unbalance;

said third variable impedance interconnected to said first comparator means wherein said boom may be raised to a first preselected height determined by the impedance of said third variable impedance; and a second electrical circuit means for automatically and continuously orienting said implement in a preditermined relationship with said vehicle during the raising thereof.

2. The apparatus of claim 1 wherein said second electrical circuit means comprises:

a fourth variable impedance associated with said boom and adapted to provide a second feedback signal indicative of the position of said boom;

a fifth variable impedance associated with said implement and adapted to provide a third feedback signal indicative of the position of said implement;

a sixth variable impedance associated with said implement and adapted to effectuate a movement of said implement in response to a second electrical signal;

second comparator means interconnected between said fourth, fifth and sixth variable impedances for detecting and amplifying an impedance unbalance between said fourth, fifth and sixth variable impedances in response to the movement of said boom wherein said resultant unbalance produces said second electrical signal which effectuates the movement of said implement and wherein movement of said implement effectuates a change in said third feedback signal thereby eliminating said unbalance and continuously orienting said implement in a predetermined relationship with said boom.

3. The apparatus of claim 2 wherein each of said variable resistance comprises a potentiometer:

wherein the resistance of said first potentiometer and said fourth potentiometer is varied by the movement of said boom;

wherein the resistance of said fifth potentiometer is varied by the movement of said implement;

wherein the resistance of said second potentiometer is varied by the movement of a first hydraulic valve means associated with said boom; and wherein the resistance of said sixth potentiometer is varied by the movement of a second hydraulic valve means associated with said implement.

4. The apparatus of claim 3 wherein said control circuit further comprises:

a third electrical circuit means for automatically rotating said implement from a first position to a second position and wherein said third electrical circuit means includes means for maintaining said implement in said second position for a preselected period of time and then automatically returning said implement to said first position.

5. The apparatus of claim 4 wherein said third electrical circuit means comprises means for electrically disconnecting said sixth potentiometer from said second comparator means for a preselected period of time wherein an unbalance signal occurs from said second comparator means when said sixth potentiometer is disconnected thereby causing said implement to move from said first position to said second position and return to said first position when said sixth potentiometer is reconnected to said second comparator means thereby eliminating said unbalance signal.

6. The apparatus of claim 5 wherein said control circuit further comprises:

a fourth electrical circuit means for lowering said boom and said implement to a second preselected height, and wherein said fourth electrical circuit includes a seventh potentiometer interconnected to said comparator means and means for disconnecting said third potentiometer from said first comparator means whereby said boom may be lowered to said second preselected height determined by the impedance of said seventh potentiometer.

7. The apparatus of claim 6 wherein said control circuit further comprises:

a fifth electrical circuit means for automatically disabling said second electrical circuit means when said boom reaches a third preselected height and wherein said fifth electrical circuit means automatically orients said implement in a preselectable angular relationship with the surface upon which said earthworking mechanism is located.

8. The apparatus of claim 7 wherein said fifth electrical circuit means comprises:

an eighth potentiometer interconnected with said second comparator means; and means for disconnecting said fourth potentiometer from said second comparator means whereby an unbalance signal is developed which causes the movement of said implement to a position determined solely by the impedance of said eighth potentiometer thereby establishing said preselectable relationship of said implement.

9. The apparatus of claim 8 wherein said control circuit further comprises:

a sixth electrical circuit means adapted to enable said boom and said implement to follow the contour of the surface upon which said earth-working mechanism is located, and wherein said sixth electrical circuit means includes a means for short circuiting said first comparator means whereby an uncorrectable unbalance signal results thereby enabling said boom and said implement to follow said contour.

10. The apparatus of claim 9 wherein said control circuit further comprises:

a first manual means for controlling the raising and lowering of said boom and said implement; and a second manual means for controlling the position of said implement.

* * * * *